(12) United States Patent
Hubbard (10) Patent No.: US 6,334,418 B1
(45) Date of Patent: **\*Jan. 1, 2002**

(54) METHOD OF USING FUEL IN AN ENGINE

(76) Inventor: William A. Hubbard, 117 St. Annes, Ford's Colony, Williamsburg, VA (US) 23188

( * ) Notice: Subject to any disclaimer, the term of this patent is extended or adjusted under 35 U.S.C. 154(b) by 0 days.

This patent is subject to a terminal disclaimer.

(21) Appl. No.: 09/484,148

(22) Filed: Jan. 18, 2000

Related U.S. Application Data (63) Continuation-in-part of application No. 09/313,931, filed on May 18, 1999, now Pat. No. 6,089,021, which is a continuation-in-part of application No. 08/937,708, filed on Sep. 26, 1997, now Pat. No. 5,927,255.

(51) Int. Cl.[7] ...................................................... F02N 17/00
(52) U.S. Cl. ................................ 123/179.21; 123/169 PB
(58) Field of Search ............................. 123/179.5, 179.6, 123/179.21, 169 PB (56) References Cited

U.S. PATENT DOCUMENTS

| | | | |
|---|---|---|---|
| 4,325,345 A | 4/1982 | Wilkinson et al. | |
| 4,375,799 A | 3/1983 | Swanson | |
| 4,552,102 A | * 11/1985 | Efle | ............ 123/179.21 |
| 4,849,604 A | * 7/1989 | Woolcott | ................ 123/179.21 |
| 4,896,636 A | * 1/1990 | Pfefferle | .................. 123/179.21 |
| 4,955,332 A | 9/1990 | Talbert | |
| 4,958,598 A | 9/1990 | Fosseen | |
| 5,042,447 A | 8/1991 | Stone | |
| 5,086,747 A | 2/1992 | Curhan | |
| 5,115,787 A | 5/1992 | von Pickartz | |
| 5,119,794 A | 6/1992 | Kushida et al. | |
| 5,533,486 A | 7/1996 | Qutub | |
| 5,558,069 A | 9/1996 | Stay | |
| 5,664,547 A | * 9/1997 | Klak et al. | ............... 123/179.21 |
| 5,927,255 A | 7/1999 | Hubbard | |
| 6,089,201 A | * 7/2000 | Hubbard | .................. 123/179.21 |

* cited by examiner

Primary Examiner—John Kwon
(74) Attorney, Agent, or Firm—Leonard Bloom (57) ABSTRACT

A method of using a petroleum based fuel in an internal combustion gasoline engine. The fuel has a flash point of at least 5° F. and the fuel is heated, within the engine, to a temperature above 5° F. The electrodes of the spark plugs are continually energized until the electrodes are at a temperature above the flashpoint of the fuel. The electrodes of the spark plugs are then energized intermittently and the fuel is introduced into the heated cylinders to ignite the fuel in the cylinders in a selected sequence. An alternate embodiment of a heated electrode is disclosed.

13 Claims, 12 Drawing Sheets

PRIOR ART

METHOD OF USING FUEL IN AN ENGINE

CROSS REFERENCE TO RELATED APPLICATION

The present invention is a continuation-in-part of application Ser. No. 09/313,931 filed May 18, 1999 now U.S. Pat. No. 6,089,021 which is a continuation-in-part of application Ser. No. 08/937,708, filed Sep. 26, 1997 which is now U.S. Pat. No. 5,927,255 the disclosures of which are incorporated by reference herein in their entirety.

BACKGROUND OF THE INVENTION

The present invention relates to a method of using fuel in an engine and more particularly to a fuel having a flash point over 5° F. and the method of igniting the fuel in the cylinders of the engine.

The gasoline internal combustion engine is designed to utilize a fuel with a flash point of approximately −40° F. to −50° F. The fuel is mixed with air in a carburetor and passed to the cylinder, or is introduced by an injector into the cylinder, where a spark plug is timed to generate a spark to ignite the fuel/air mixture. Other engines such as diesel engines and jet airplane engines use a fuel with a higher flash point of up to 150° F. The low flash point of gasoline is a major source of approximately 10,000 automobile fires per year in the United States. Also, gasoline contributes significantly to atmospheric pollution while the gasoline is being pumped into the fuel tank.

The ability to use fuels having a flash point of at least 100° with internal combustion engines would provide significant economical and environmental benefits. Starting at the refinery, producers would not need to fractionate the crude petroleum to the same extent. This would result in savings in cost to the refiner. There would be fewer types of fuel required and the need for storage of many different fuels would be reduced. A single fuel would be available for a broad spectrum of vehicles and engines. There would be fewer fires and consequently there would be fewer human injuries and insurance costs could be reduced.

In order to use this fuel, the operation of the internal combustion engine can be changed and controlled. Also, redesigned electrodes, more efficient for the fuel are desired.

BRIEF SUMMARY OF THE INVENTION

It is an object of the present invention to provide a method wherein fuel with a flash point of at least 50° F. can be used in an internal combustion engine.

It is a further object of the present invention to provide a method for controlling the heating of cylinders within an internal combustion engine and for introducing into each heated cylinder a fuel having a flash point of at least 5° F.

It is another object of the present invention to provide a method of controlling the introduction of fuel within the cylinder to more effectively use the fuel.

It is still another object of the invention to provide an electrode for a spark plug which is more effective with the fuel.

In accordance with the teachings of the present invention, there is disclosed a method of operating an internal combustion engine having a plurality of cylinders. Each cylinder has therein a respective spark plug having a pair of electrodes and a respective piston. The piston in each cylinder moves axially in a stroke. The stroke has a top position proximal to the respective electrodes and a bottom position distal from the respective electrodes. The internal combustion engine uses a petroleum based fuel having a flash point of at least 5° F. A control means is provided attached to the engine. The control means controls the energizing of the electrodes in the spark plugs wherein the electrodes may be energized on a continuous basis or on an intermittent basis. The control means further controls the introduction of fuel into the cylinders. The electrodes of all of the spark plugs are energized continuously by the control means until the electrodes are heated to a temperature greater than the flash point of the fuel. Fuel as introduced into the respective cylinders by the control means when the respective piston is approximately at the top of the stroke such that the fuel ignites and forces the respective piston to the bottom of the stroke. In this manner, the engine is started. The electrodes of the respective spark plugs are energized intermittently by the control means on a timing basis. Fuel is introduced into the respective cylinders by the control means in a predetermined sequence, wherein the fuel in the respective cylinders is ignited by the intermittent firing of the electrodes to operate the engine. The fuel is continued to be introduced into the respective cylinders in a desired sequence and the respective electrodes are continued to be energized sequentially, wherein the engine operates normally using the fuel.

Further in accordance with the teaching of the present invention, there is disclosed electrodes for use in a spark plug in a cylinder in an internal combustion engine. Each electrode has an electrical conducting element which is energized to produce a spark. A heating element is juxtapositioned to the conducting element. A means is provided for heating the heating element separately from the electrical conducting element, wherein the heating element may be heated to a desired temperature and the heating may be discontinued. Fuel in the cylinder is initially heated by the heating element in the immediate vicinity of the electrical conducting element such that the heated fuel is more rapidly ignited when the electrical conducting element is energized to produce the spark.

These and other objects of the present invention will become apparent from a reading of the following specification taken in conjunction with the enclosed drawings.

DESCRIPTION

Figure 1:
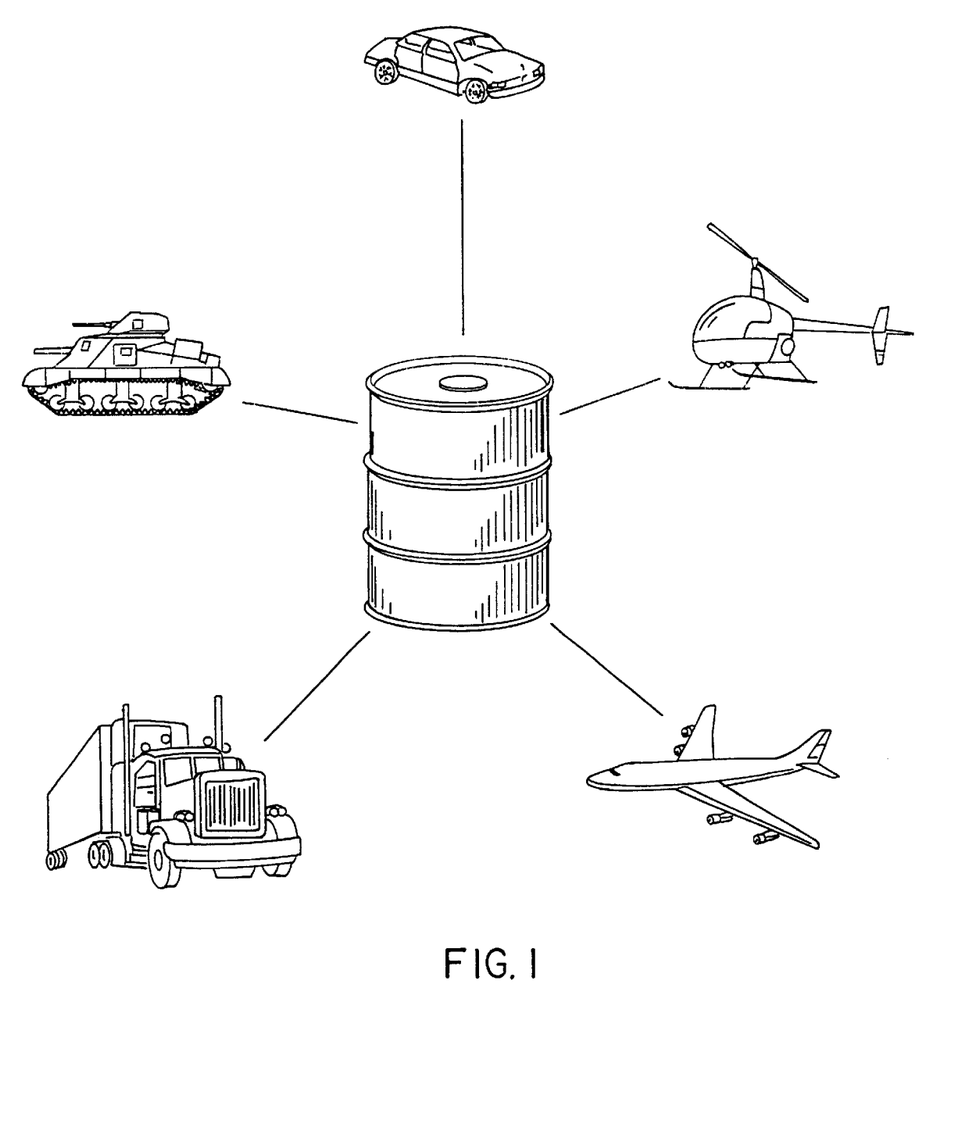
FIG. 1 is a diagram showing the plurality of vehicles in which the fuel of the present invention may be used.

Referring now to FIG. 1, the fuel of the present invention may be used with a wide variety of vehicles. As will be described, a gasoline internal combustion engine as found in automobiles can be used with the fuel. Also, the fuel can be used to operate the engines of trucks, helicopters, tanks and jet airplanes as well as engines used to provide power in emergency situations for commercial, industrial and residential applications.

Figure 2:
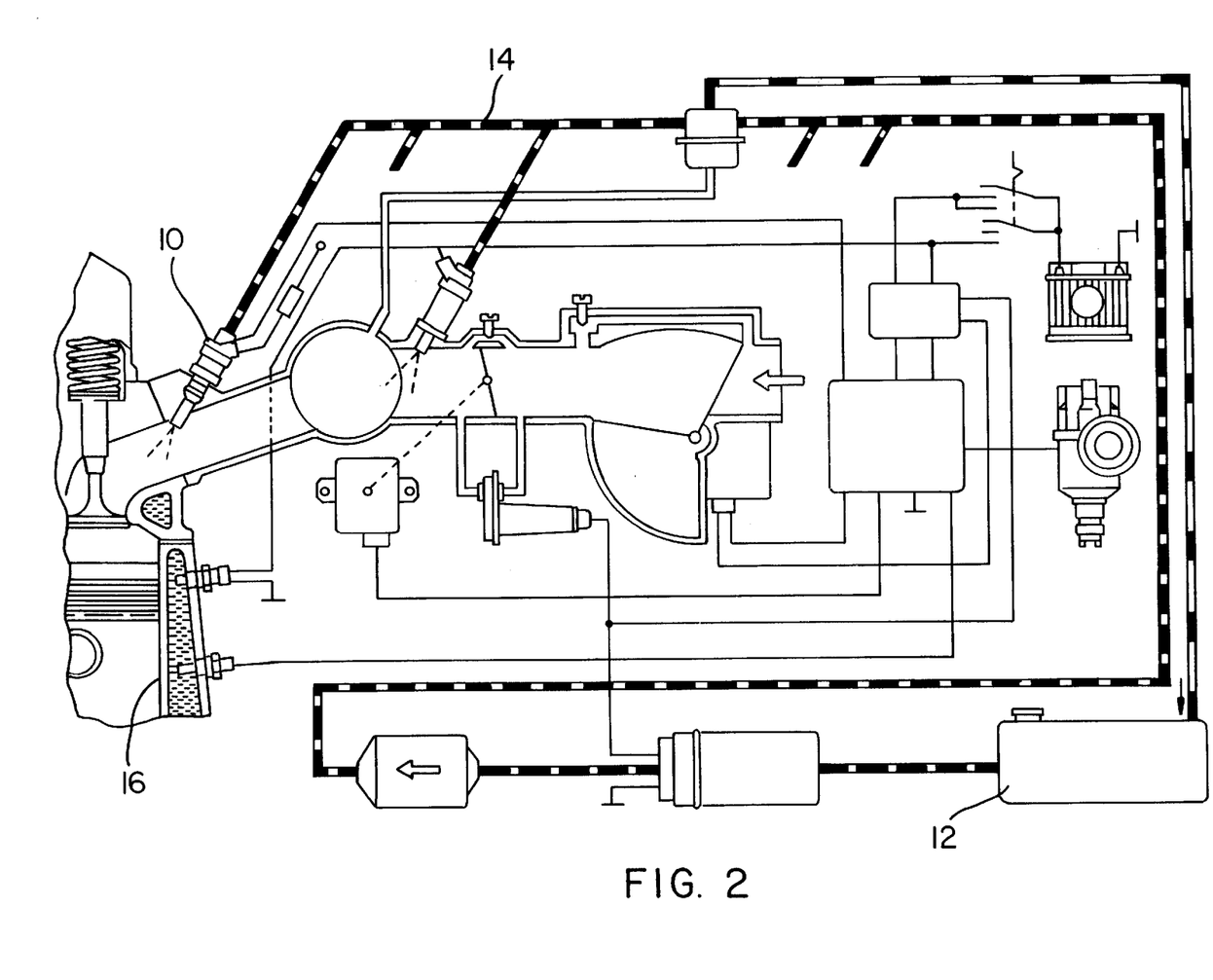
FIG. 2 is a diagram of the fuel system in a vehicle without a carburetor.
Figure 3:
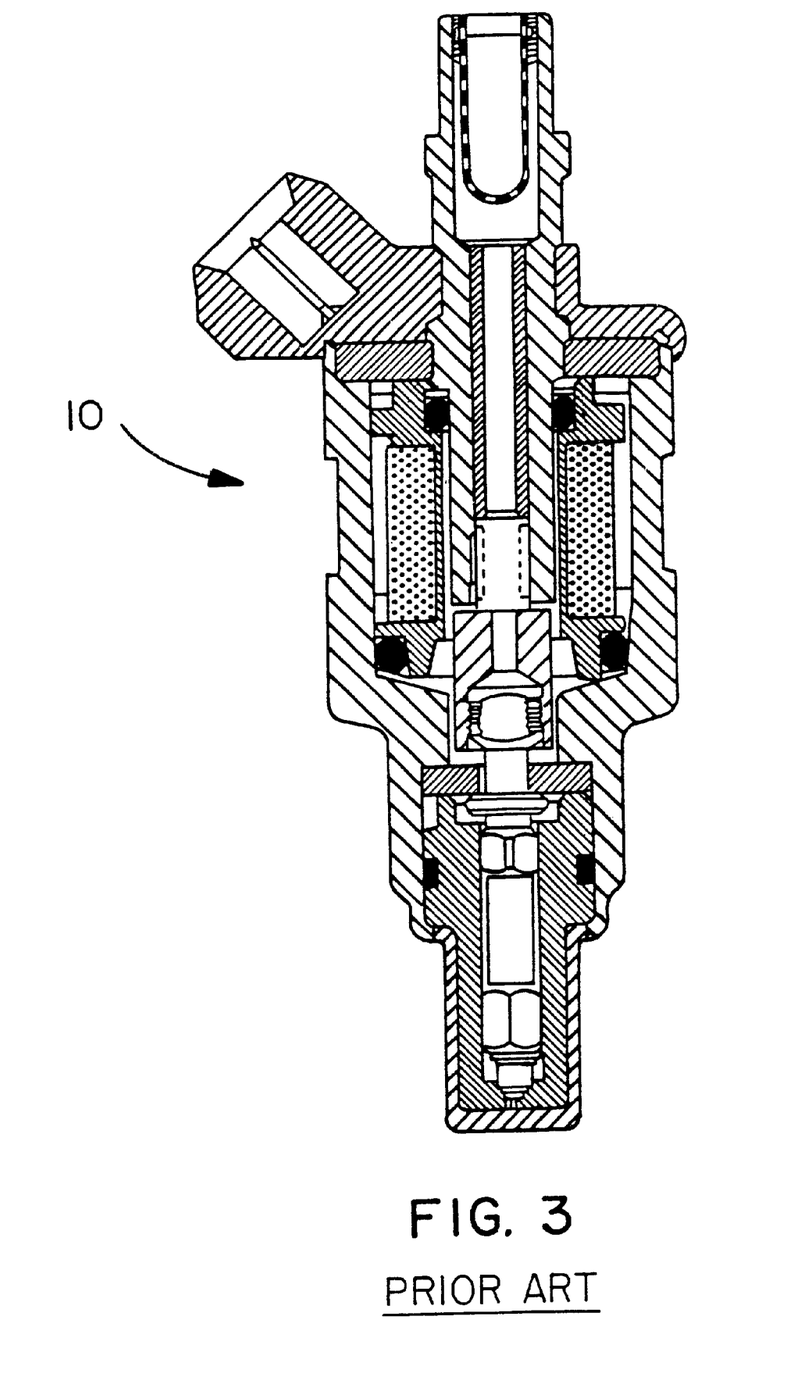
FIG. 3 is an enlarged cross-sectional view of the fuel injector of the prior art.
Figure 4:
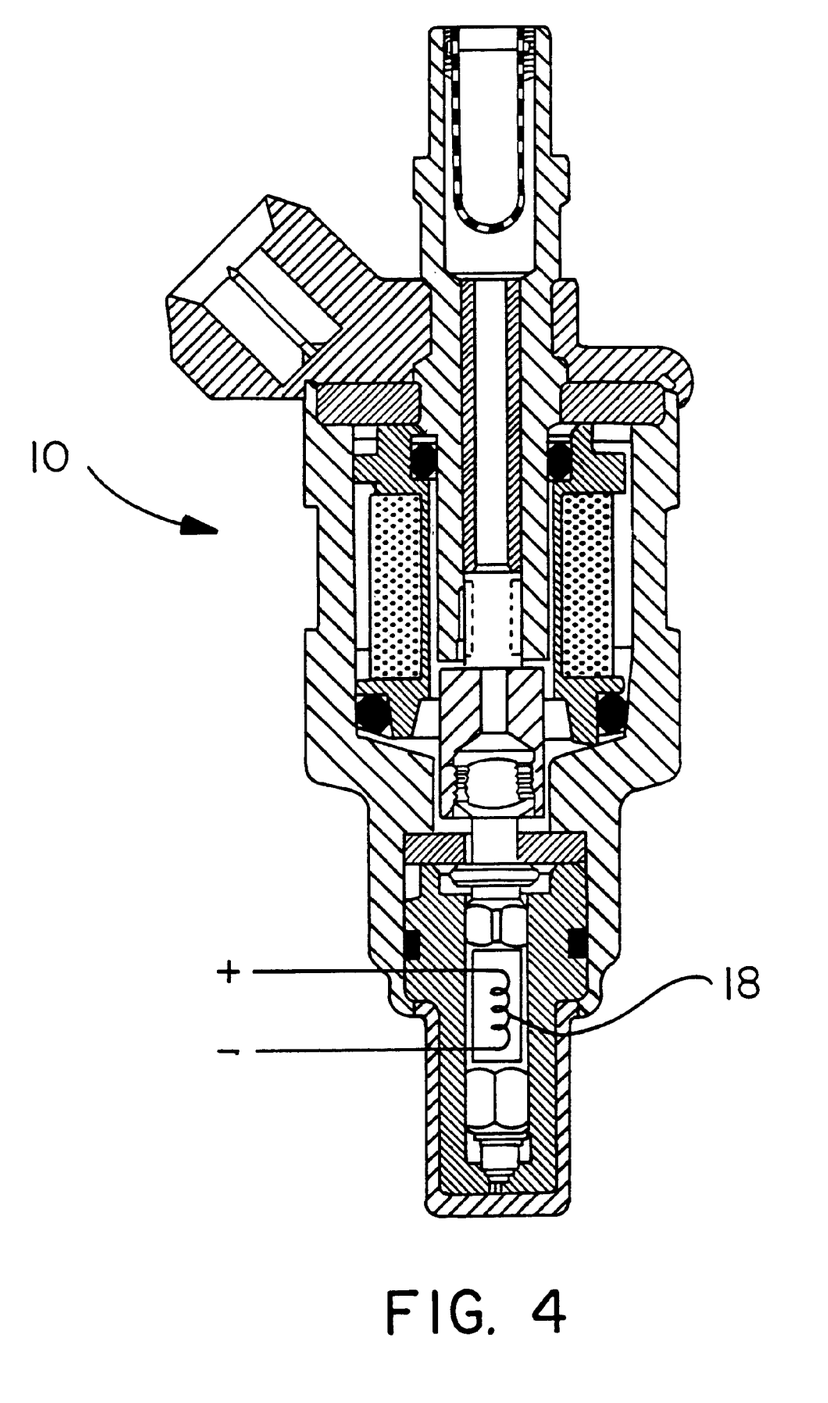
FIG. 4 is an enlarged cross-section view of FIG. 3 showing the present invention having heating means disposed in the fuel injector.

In those vehicles which do not have a carburetor (FIG. 2), the fuel injector 10 is used to introduce fuel into the cylinders of the engine. The fuel is stored in a fuel tank 12 and pumped through fuel lines 14, to the fuel injector 10 and into the cylinders 16 of the engine. A means for heating the fuel 18 is disposed in the fuel path and preferably in the fuel injector 10 (FIG. 4). The heating means 18 may be an electrically heated resistance wire in the shape of a coil, a grid or other form which may be disposed in the fuel injector 10. In this manner, the fuel is heated just prior to being injected into the cylinder port. Other heating means including spark plugs (as will be described) and means known to persons skilled in the art may be used. The heating means must be capable of heating the fuel above 5° F. or above the flash point of the fuel if the flash point of the fuel is higher than 5° F. Preferably, the fuel has an initial boiling point (ASTM D 86) high enough so that the flash point is above 100° F. and this initial boiling point is approximately 315° F. The dry point (ASTM D 86) is close to, or slightly higher than, the normal value for gasoline, which is approximately 400° F.–425° F. With heated fuel and fuel injection, the dry point may be as high as 575° F. The petroleum fraction known as mineral spirits may be used as the fuel. Also other petroleum fractions may be used.

Figure 5:
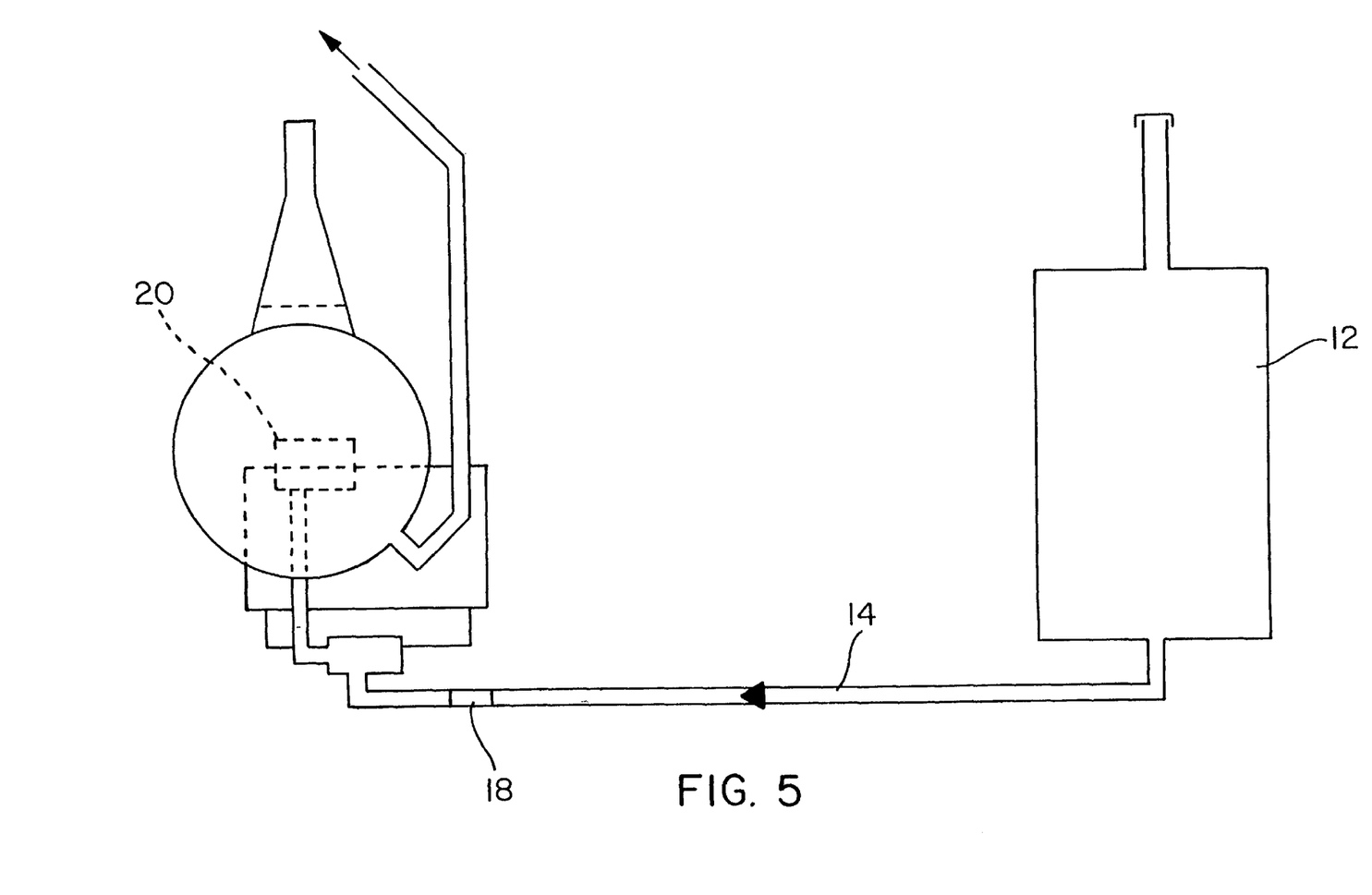
FIG. 5 is a diagram of the fuel system of a vehicle with a carburetor.

In those vehicles having a carburetor (FIG. 5), the fuel is pumped from the fuel tank 12, through the fuel path 14 to the carburetor 20 and into the engine cylinder 16. Prior to entering the carburetor 20, it is preferred that the fuel is heated by the above described heating means 18. A combination of heating means such as an electrically heated resistance and a spark plug may be used.

The function of the heating means 18 is to elevate the fuel over the flash point of the fuel and to enable the fuel to ignite in the cylinder of the vehicle because the engine cannot start until the fuel is at a temperature exceeding the flash point of the fuel. With a fuel such as gasoline, the flash point is very low (approximately –40° F. to –50° F.) due to the butane and other volatile components present. After the engine has operated a relatively brief period of time, the engine is warm and the cylinder is at a temperature exceeding the flash point of the fuel. The heating means may then be removed or inactivated so as to no longer heat the fuel prior to introducing the fuel into the cylinder. Care must be taken not to heat the fuel above its autoignition temperature since this would cause the fuel to burn before the spark plug fires. The autoignition temperature varies for different fuels, but, for the present invention is above 400° F.

Only a small volume of fuel, approximately 0.002 ml per cylinder, would have to be heated at one time so that heating can occur rapidly. The heating cycle is controlled electronically and is connected to a temperature monitor. When the engine temperature rises to a predetermined value, the heating is discontinued. The heating may be produced in the fuel injector, the fuel rail or a location between these. It is preferred that the heating be performed as close to the cylinder as possible to reduce the amount of fuel which requires heating. This is especially important when the fuel is used in an engine with a carburetor engine. The fuel may be heated to a temperature higher than the flash point to compensate for the fuel's cooling in route to the cylinders. Vehicles having engines with carburetors or with fuel injection may be retrofit to use the fuel and method of the present invention.

Figure 6:
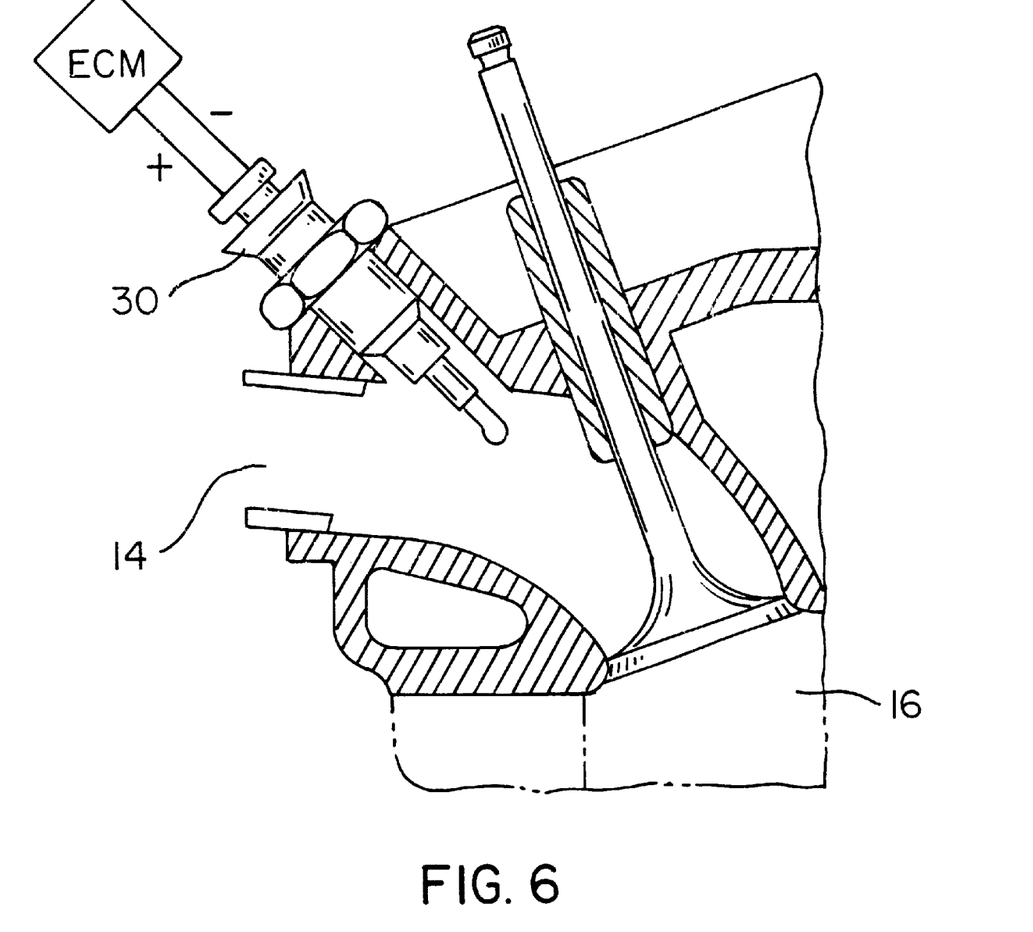
FIG. 6 is a diagram of a fuel system of a vehicle with a glow plug.

Another heating means for the fuel is the inclusion of a glow plug in each cylinder in a manner similar to a diesel engine (FIG. 6). The glow plug may be heated when the engine is to be started and, after a brief heating period, is available to heat the fuel within the cylinder or as it enters the cylinder. As in a diesel engine, the glow plug is kept warm only until the engine has become warm and the power to the glow plug is disconnected. Diesel glow plugs are heated as high as 1500° F. to start a diesel engine. This is above the autoignition temperature of the fuel of the present invention and, if heated to this temperature, would cause premature ignition. A glow plug temperature of 400° F.–500° F. is satisfactory. The glow plug may be used for starting in conjunction with a spark plug and a preheater for the fuel in the fuel line wherein, after initial heating above the flash point, the warm engine and the heated fuel line are sufficient to permit continuing functioning of the engine with the fuel having a flash point over 5° F.

Virtually all gasoline engines will start and run well on a suitable fuel with a flash point as high as 150° F. providing that the engine has been warmed up. The only reason for the very low flash point of gasoline is so that the engine will start when it is cold and particularly in cold weather. The temperature of the engine is monitored by the Electronic Control Module (ECM) in most modern engines with fuel injection. This ECM could easily be modified to include control of the fuel heating. The automatic choke is sometimes controlled by the ECM or a separate thermostat. This could also be modified to control the fuel heating.

The fuel of the present invention is preferably petroleum based with the following characteristics:
1. Flash point above 5° F. and preferably above 100° F. (ASTM D 56).
2. Initial boiling point (ASTM D 86) consistent with the flash point.
3. Dry Point (ASTM D 86) generally in the gasoline boiling range and no higher than 425° F. for engines with carburetors. With a heated fuel and with fuel injection, the dry point could be raised much higher to 575° F.
4. An octane number high enough to be satisfactory in normal engines. A special engine adapted to use a lower octane rating might be required. This could be particularly true for military use.
5. A cetane number high enough to be used in normal diesel engines. Again, a special engine might be required in order to use a lower cetane rating. This would particularly apply to military use. Since cetane ratings tend to decline as octane ratings rise, and vice versa, a compromise is required at levels somewhat lower than optimum in order to obtain with a fuel that can be used to replace both gasoline and diesel fuel. Specially designed engines might be required in order to use this compromise fuel.

6. The aromatic content should be low enough (probably below 35%) so that excessive smoke would not be generated in jet engine use. For jet engines, the octane and cetane ratings would be irrelevant.

7. The fuel may contain from 0% to 25% of an oxygenated component such as amyl alcohol which has a flash point above 100° F. This added oxygen in the fuel provides a cleaner burning fuel. In addition, the amyl alcohol or higher alcohols could combine with the aromatics in the fuel to form a "co-solvent" which has the ability to dissolve gums that tend to build up in engines through the use of gasoline. Other oxygenated petrochemicals which may be used would be alcohols with 6 carbons or more, and ethers similar to TAME (tertiary amyl methyl ether) or MTBE (methyl tertiary butyl ether) as long as the flash point is high enough. Other more expensive oxygenated materials that might possibly be used would include dimethyl formamide (flash point=135° F.), cyclohexanol (flash point=154° F.) and 2-ethyl hexanol (flash point=166° F.). It is possible that some of the higher boiling ketones and esters could be used if they didn't damage the rubber and plastic components in the fuel system. These could include cyclohexanone, diacetone alcohol, diisobutyl ketone, ethyl butyl ketone and 2-ethyl hexyl acetate. A number of ethylene and propylene glycol based materials may be satisfactory, however, due to questionable stability in storage, these compounds should be avoided.

Figure 7:
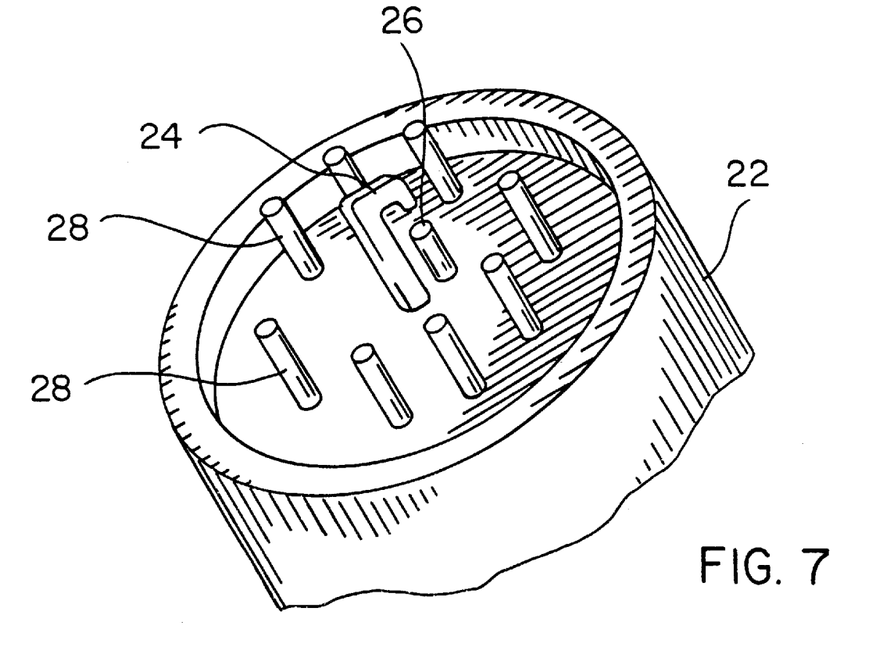
FIG. 7 is an enlarged perspective view of the electrodes on a spark plug in the elevated position.
Figure 8:
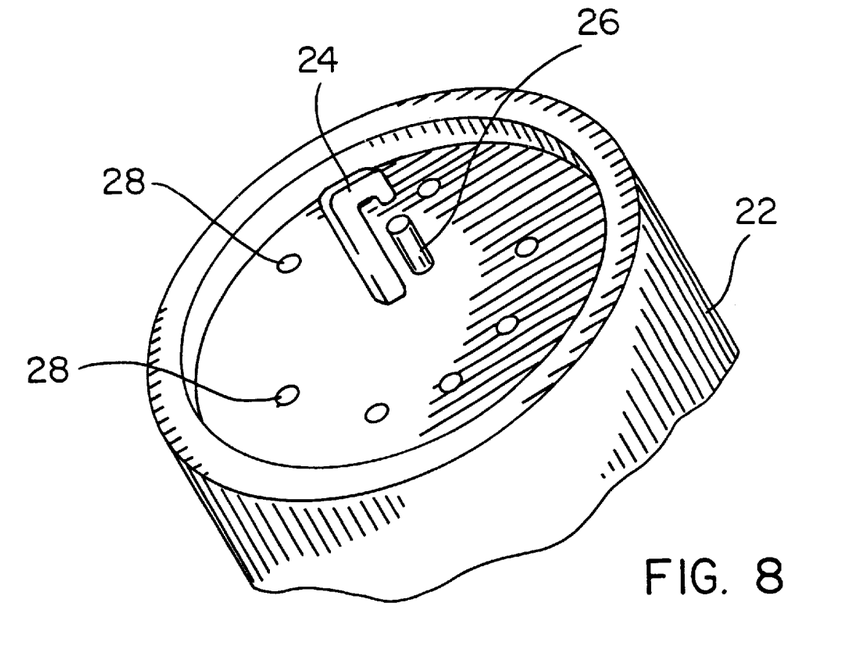
FIG. 8 is the spark plug of FIG. 7 with the electrodes retracted.
Figure 9:
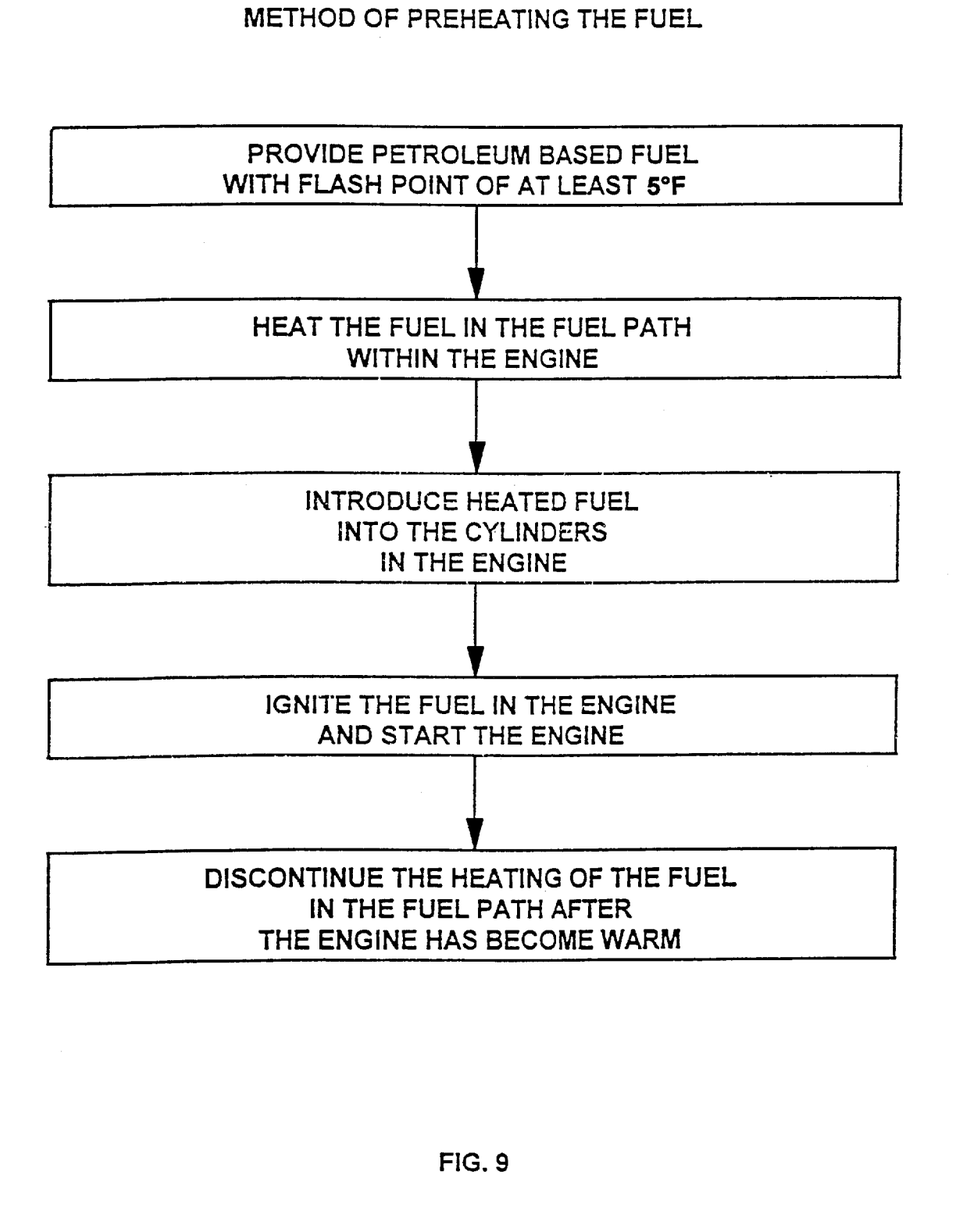
FIG. 9 is a flow diagram showing the method of the present invention in which the fuel is heated prior to the fuel being introduced into the cylinder.
Figure 10:
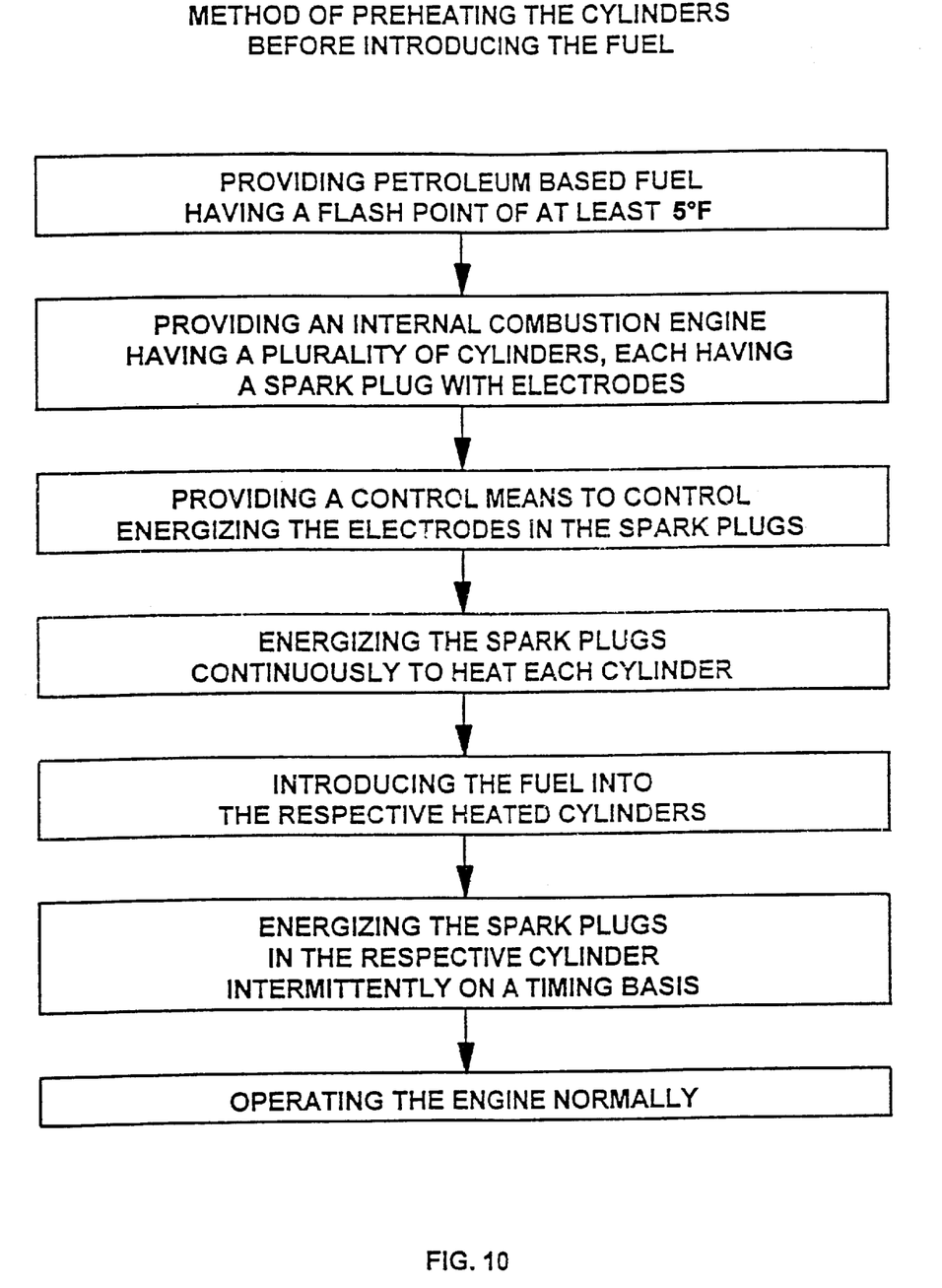
FIG. 10 is a flow diagram showing the method of the present invention of preheating the cylinders before introducing the fuel.
Figure 11:
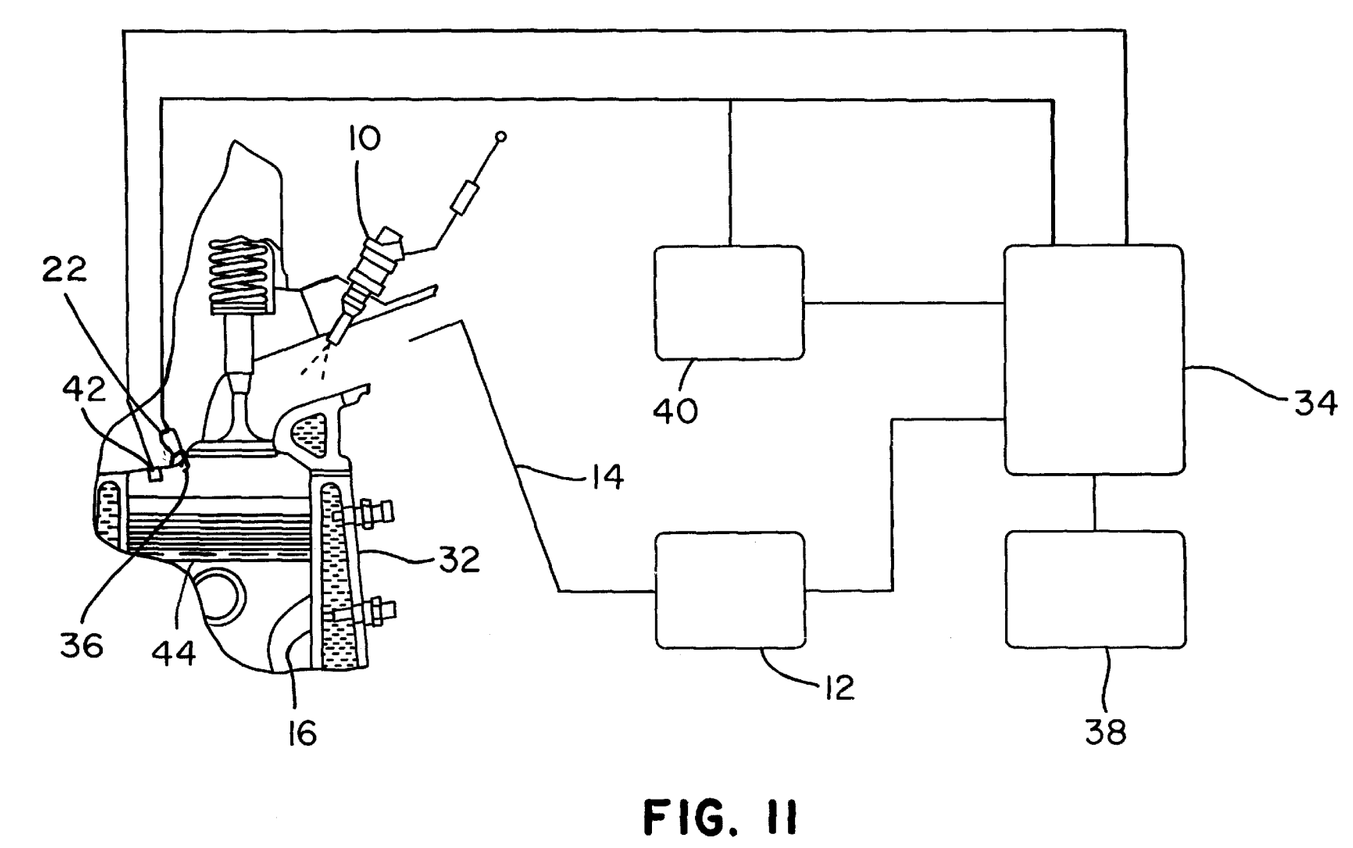
FIG. 11 is a schematic diagram showing the operation of the present invention.

Referring to FIGS. 7 and 8, one way to heat the fuel-air mixture inside the cylinder head is to generate a huge spark which would heat the fuel above its flash point. FIG. 7 shows that the electrodes on the spark plug 22 may include not only the conventional center electrode 24 with adjacent electrode 26 with a gap separating the two electrodes, but further has a plurality of retractable electrodes 28 disposed circumferentially of the center electrode 24 and separated from the center electrode 24. When the engine is to be started, the retractable electrodes 28 are elevated and the adjacent electrode 26 is shut off electrically. The ignition coil generates up to 40,000 volts sufficient for the spark to jump the gap from the center electrode 24 to the retractable electrodes 28. After the engine has started and has warmed up, the retractable electrodes 28 are retracted, as shown in FIG. 8, by a solenoid (not shown) and the adjacent electrode 26 is electrically reconnected so that the spark passes between the center electrode 24 and the adjacent electrode 26. Because the engine is warmed to a temperature above the flash point of the fuel, the retractable electrodes 28 are not needed to ignite the fuel.

In another embodiment, for start up of the engine, the two center electrodes 24 and 26 in FIG. 7 are shut off electrically, the outer electrodes 28 are charged so that each positive electrode has negatively charged electrodes on both sides of it. The electrodes all fire simultaneously and this generates a huge circular spark which is sufficient to heat the fuel to its flash point. Again, after warm up, the outer circle of electrodes are disconnected electrically and retracted while the engine runs on the center electrodes.

In a further embodiment, the outer ring of electrodes 28 are never elevated but are only conductors or electrodes on the face of the plug. For start up, adjacent electrode 26 is disconnected electrically and the other electrodes 28 are used. Thus, the spark jumps from the center electrode 24 to all of the surrounding electrodes 28. Again, this generates a large spark which provides the necessary heating. After warm up, the surrounding electrodes 28 are shut off electrically and alternate electrode 26 is used. This system has the advantage of eliminating moving parts and uses only electrical switching.

In still another embodiment, the fuel is not heated before introducing the fuel into the respective cylinders 16 of the internal combustion engine 32. Rather the firing chambers within the cylinders are preheated to a temperature greater than the flash point of the fuel and the fuel is introduced into the heated cylinder firing chamber.

A control means 34 such as a computer or electrically operated device is attached to the engine 32. The control means 34 controls the energizing of electrodes 36 in spark plugs 22 mounted in each of the plurality of cylinders 16 within the engine 32. To start the engine, the control means 34 energizes the electrodes 36 in each cylinder 16 on a continuous basis to heat the electrodes in the firing chamber to a temperature greater than the flash point of the fuel. The continuous energizing of the electrodes could be for a few seconds, possibly two to ten seconds. The length of time to energize the electrodes may be for a predetermined time or may be programmed into the control means dependent on the ambient temperatures of the air, the engine block and the firing chamber in the cylinder. If these temperatures are lower, the energizing would be for a longer period of time to raise the temperature within the firing chambers in the cylinders. It would be desirable to use an alternating current for the continuous ignition in order to conserve the spark plugs. Persons skilled in the art are familiar with means to convert direct current from a battery to alternating current by a converter and such means are not the subject of this application.

Alternately, a temperature sensing means 42 may be disposed in the firing chamber of at least one cylinder or in the engine block, cylinder head, or the exhaust. The temperature sensing means provides information to the control means 34 which controls the continuous energizing of the electrodes in the respective firing chambers in the cylinders 16 until all the firing chambers in the cylinders 16 have been heated to a desired operating temperature.

When the firing chambers in the cylinders 16 are at the desired temperature, the control means 34 discontinues the continuous energizing of the electrodes 36. The control means 34 then energizes the spark plugs 22 intermittently and introduces the fuel 12 through the fuel lines 14 into the respective firing chambers such that the fuel ignites to start the engine. The control means 34 continues to energize the spark plugs 22 on a timing basis to ignite the fuel within the respective firing chambers. The fuel 12 is introduced into the respective firing chambers 16 in a desired sequence and the respective electrodes are energized sequentially such that the engine operates normally using the fuel.

Figure 12:
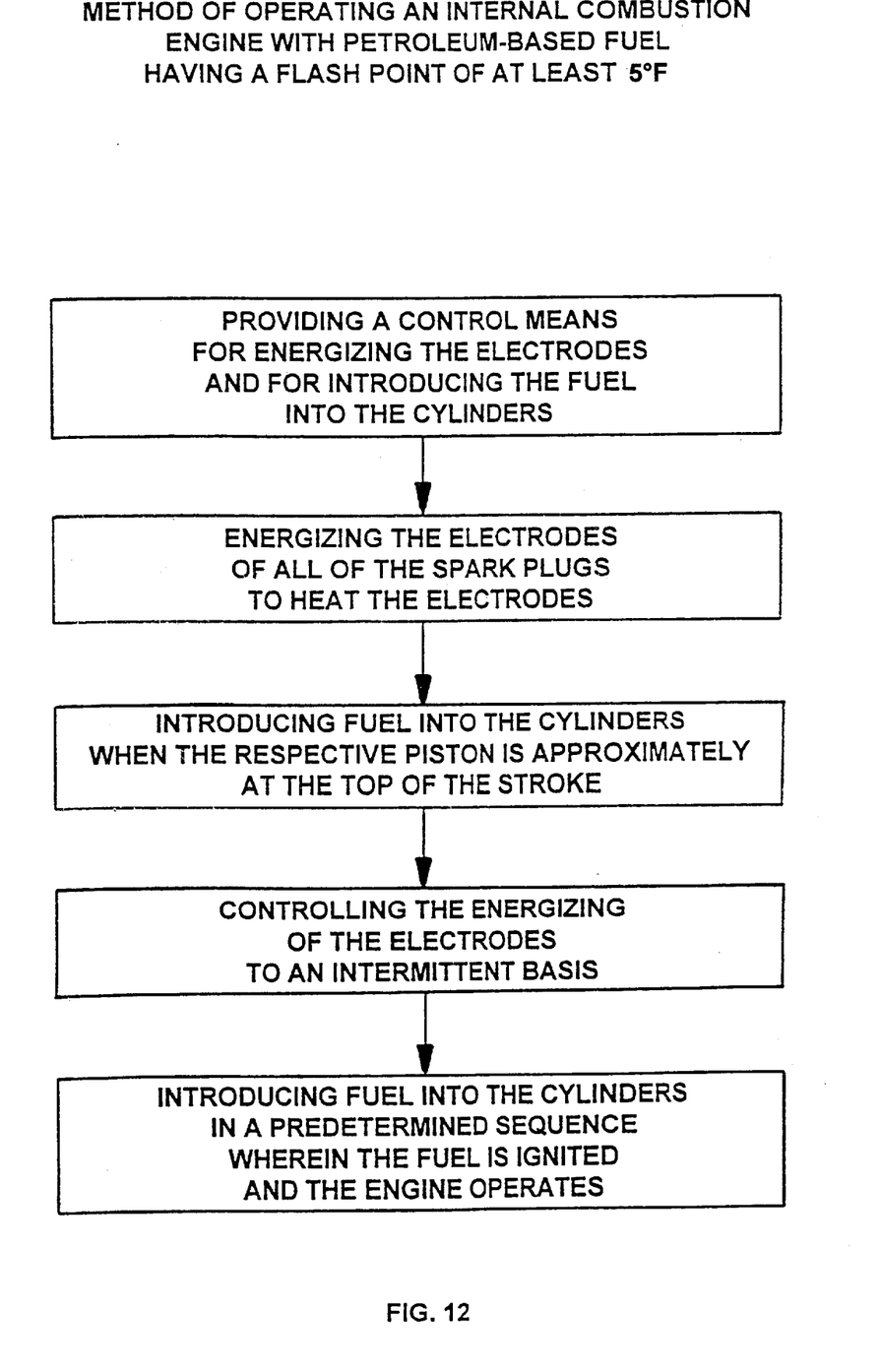
FIG. 12 is a schematic diagram showing the method of operating the engine.

An internal combustion engine having a plurality of cylinders 16 may use the fuel with the high flash point as disclosed herein (FIG. 12). Each cylinder 16 has a respective spark plug 22 with electrodes 36 which are energized to produce a spark. Each cylinder has a respective piston 44 which moves axially within the cylinder in a stroke. The stroke has a top position proximal to the respective electrodes and a bottom position distal from the respective electrodes. When the piston is at the bottom position of the stroke, fuel and air are drawn into the cylinder. When the piston is at the top position of the stroke, the fuel-air mixture is compressed within the cylinder. The control means 34 controls the energizing of the electrode 36 in the spark plug such that the electrodes may be energized on a continuous basis or on a predetermined intermittent basis which is timed. The control means 34 also controls the introduction of fuel into the respective cylinder only on the intake 13 cycle and not in the exhaust cycle of the four cycles of operation. The electrodes are spaced apart so that when energized, a spark is created between the electrodes. The electrodes may be mounted opposite one another in the piston and may even be separated by 180°.

Figure 13:
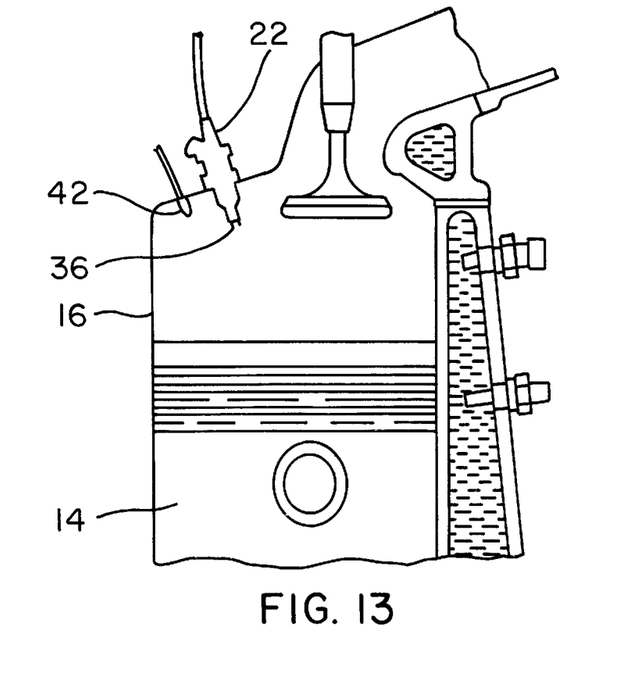
FIG. 13 is a partial cross section view of a cylinder having a piston at the bottom of its stroke to admit fuel into the cylinder.
Figure 14:
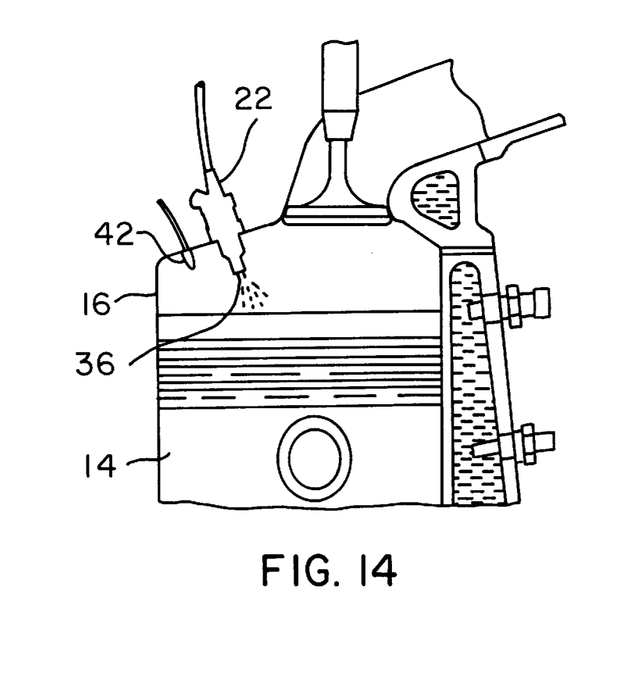
FIG. 14 is a partial cross section view of a cylinder having a piston at the top of its stroke compressing the fuel/air and energizing the spark plug.

In a preferred operation (FIGS. 13 and 14) the electrodes are energized continuously for approximately 0.5 to 5.0 seconds before the engine starts. This energizing serves to generate heat in the respective cylinders. After this period of time, the control means 34 causes the electrodes to be energized on an intermittent basis. The electrodes in each cylinder are now energized when the piston in the respective cylinder is at the top of the stroke and energization is continued until the piston is approximately half way through the down stroke toward the bottom position of the stroke. Energization is then discontinued in the respective cylinder. When the piston is again at the top of the stroke, the electrode would again be energized to produce a spark to ignite the fuel-air mixture to force the piston into the down stroke. The electrodes in the spark plugs of the respective cylinders are intermittently energized by the control means on a timing basis and the engine continues to operate with introduction of fuel and energizing of the electrodes in a desired sequence being controlled by the control means.

If the engine is a diesel engine, as soon as the engine was operating normally, the energizing of the electrodes would be discontinued by the control means and the engine would operate by the heat produced in the compression causing the fuel to ignite.

The above method prevents ignition of the fuel-air mixture when the piston is at the bottom of the stroke or in an exhaust cycle. This eliminates "back-fire" which could damage the engine and/or the exhaust system.

In an alternative embodiment, the electrode 36 may be formed with a heating element 46 juxtapositioned to the electrical conducting element 48. The element may be interwrapped, overlaid or in a sandwich configuration. A means is provided to heat the heating element 46 separately from electrical conducting element 48. The means may be the control means 34 or a separate means. The heating element 46 is heated to a desired temperature and heating is discontinued if desired. In this manner, the fuel-air mixture in the cylinder is heated in the immediate vicinity of the electrical conducting element such that the fuel-air mixture is more rapidly ignited when the electrical conducting element is energized to produce a spark.

Figure 15:
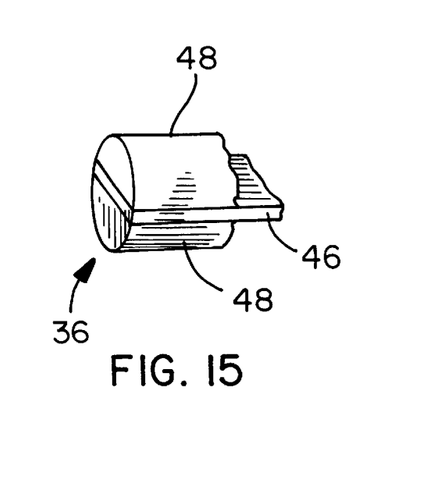
FIG. 15 is a perspective view of a portion of an electrode with a conducting element and a heating element.

FIG. 15 shows an example of a sandwich configuration. Initially the conducting elements 48 are connected to oppositely charged sources of electricity so that current flows through the heating element 46 which has a higher electrical resistance and is a poorer conductor of electricity. When the desired temperature is achieved, a control means disconnects the oppositely charged sources of electricity from the conducting elements and reconnects the conducting elements to a common terminal. The other electrode in the cylinder is similarly heated but, when the conducting elements are commonly connected, the two electrodes are of opposite charges such that a spark can be generated between the electrodes.

The method of the present invention has value in both military and civilian applications. In military use, it will be possible to use the same fuel for automotive, truck, tank, helicopter, and jet airplane use. This would eliminate the need for gasoline and would greatly reduce logistical problems while eliminating the safety hazard of gasoline in military operations. The original JP-1 fuel has a boiling range of 325° F.–450° F. and a flash point of 120° F. With proper attention to octane number, the JP-1 fuel could serve as the fuel for the present invention. Jet fuel differences in combustion qualities are minor and they can tolerate 20% to 25% aromatics which would help the octane number in an auto engine. JP-5 has been the Navy jet fuel in the past and its boiling range is 350° F. to 500° F. with a flash point of 150° F. This fuel may also serve as the fuel for the present invention. The 400° F. top boiling range for gasoline was put in place while cars all used carburetors and the fuel had to vaporize quickly. With fuel injection engines, this vaporizing is not so important so a 500° F. or 575° F. top boiling range may be used. In fact, diesel engines operate on much heavier and higher-boiling fuels. The fuel Jet-A is a large volume jet fuel for commercial aviation. It has a top boiling range of 575° F. with a flash point of 100° F. This fuel may also serve as the fuel for the present invention. In addition to fueling of planes, jet fuels are also used to cool the lube oils and other engine and plane parts while the fuel is on its way to the jet engines. In this cooling process, the fuel is heated as high as 300° F. or higher. At these temperatures the olefins polymerize to form gums which clog up fuel filters and heat exchangers. As noted above, the fuel containing alcohol, together with the aromatics in the petroleum based portion of the fuel, form a strong solvent to dissolve these gums.

In civilian applications there are about 10,000 automobile fires per year in this country and this could be sharply reduced with a higher flash point fuel. Also, atmospheric pollution while gassing up would be sharply reduced without the use of vacuum systems to collect the butanes and pentanes. There might be cost savings to petroleum refiners by cutting out the light ends and using a boiling range that is higher on the top side.

A further use of the present invention is for operation of internal combustion engines to power emergency equipment such as an electrical generator to provide power in the event of a power failure. This generator so operated could provide light and heat and operate elevators and other building accessories. The use of the present invention would avoid the need to store dangerous, highly flammable fuel such as gasoline in close proximity to buildings in which people live and work. The internal combustion engine powered by fuel with a flash point over 100° F. would provide a safe means to operate in an emergency even at low ambient temperatures.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A method of operating an internal combustion engine having a plurality of cylinders, each cylinder having therein a respective spark plug having a pair of electrodes and a respective piston, the piston in each cylinder moving axially in a stroke, the stroke having a top position proximal to the respective electrodes and a bottom piston distal from the respective electrodes, the internal combustion engine using a petroleum based fuel having a flash point of at least 5° F., the method comprising the steps of:

providing a control means attached to the engine, the control means controlling the energizing of the electrodes in the spark plugs wherein the electrodes are energized on a continuous basis or on an intermittent basis, the control means further controlling the introduction of fuel into the cylinders, energizing the electrodes of all of the spark plugs continuously by the control means until the electrodes are heated to a temperature greater than the flash point of the fuel, introducing fuel into the respective cylinders by the control means when the respective piston is approximately at the top of the stroke such that the fuel ignites and forces the respective piston to the bottom of the stroke, wherein the engine is started, energizing the electrodes of the respective spark plugs intermittently by the control means on a timing basis, introducing fuel into the respective cylinders by the control means, wherein the fuel in the respective cylinders is ignited by the intermittent firing of the electrodes to operate the engine, and wherein the fuel is continued to be introduced into the respective cylinders in a desired sequence and the respective electrodes are continued to be energized sequentially, and wherein the engine operates normally using the fuel.

2. The method of claim 1, wherein all of the electrodes are energized for a predetermined period of time and are then energized intermittently in a predetermined sequence.

3. The method of claim 1, wherein the predetermined time for energizing all of the electrodes is between 0.5 and 5 sec.

4. The method of claim 1, wherein the internal combustion engine is a diesel engine, all of the electrodes are energized for a predetermined period of time until the engine is operating and then the energizing of the electrodes is discontinued.

5. The method of claim 4, wherein the electrodes are spaced apart and mounted opposite to one another in the piston.

6. The method of claim 1, wherein means are attached to the engine to convert direct current from a battery to alternating current, the alternating current being used for the continuous energizing of the electrodes to conserve the spark plugs.

7. The method of claim 1, wherein sensing means are disposed in the engine to determine when the piston in each respective cylinder is at the top position of the stroke.

8. The method of claim 1, wherein the fuel is mineral spirits.

9. The method of claim 1, wherein the internal combustion engine is in a vehicle.

10. The method of claim 1, wherein the internal combustion engine is a generator.

11. Electrodes for use in a spark plug in a cylinder in an internal combustion engine, each electrode comprising:

an electrical conducting element which is energized to produce a spark, a heating element juxtapositioned to the conducting element, a means for heating the heating element separately from the electrical conducting element, wherein the heating element is heated to a desired temperature and the heating is discontinued, wherein fuel in the cylinder is initially heated by the heating element in the immediate vicinity of the electrical conducting element such that the heated fuel is more rapidly ignited when the electrical conducting element is energized to produce the spark.

12. The electrodes of claim 10, wherein two electrodes are disposed in the cylinder spaced apart from each other such that when the electrodes are energized a spark is generated between the electrodes.

13. The electrode of claim 10, wherein the electrical conducting element has two spaced apart conductors, the heating element being sandwiched between the two conductors.

* * * * *